(12) United States Patent
Ebrahimzadehveshareh et al.

(10) Patent No.: US 11,863,112 B2
(45) Date of Patent: Jan. 2, 2024

(54) POWER GENERATING UNIT WITH VIRTUAL SYNCHRONOUS GENERATOR WITH CURRENT LIMITATION

(71) Applicant: VESTAS WIND SYSTEMS A/S, Aarhus N (DK)

(72) Inventors: Esmaeil Ebrahimzadehveshareh, Aalborg (DK); Torsten Lund, Fredericia (DK); John Godsk Nielsen, Hornslet (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/628,174

(22) PCT Filed: Jul. 8, 2020

(86) PCT No.: PCT/DK2020/050209
§ 371 (c)(1),
(2) Date: Jan. 18, 2022

(87) PCT Pub. No.: WO2021/008664
PCT Pub. Date: Jan. 21, 2021

(65) Prior Publication Data
US 2022/0321041 A1    Oct. 6, 2022

(30) Foreign Application Priority Data

Jul. 15, 2019   (DK) .............. PA 2019 70465

(51) Int. Cl.
*H02P 9/00* (2006.01)
*H02P 9/02* (2006.01)

(52) U.S. Cl.
CPC ............. *H02P 9/006* (2013.01); *H02P 9/02* (2013.01)

(58) Field of Classification Search
CPC .................... H02P 9/02; H02P 9/006
See application file for complete search history.

(56) References Cited

U.S. PATENT DOCUMENTS

2018/0145582 A1* 5/2018 Shuai .............. H02M 1/32

FOREIGN PATENT DOCUMENTS

| CN | 107528495 A | 12/2017 |
|----|-------------|---------|
| CN | 108092308 A | 5/2018 |

(Continued)

OTHER PUBLICATIONS

PCT, International Search Report and Written Opinion for Application PCT/DK2020/050209 dated Sep. 15, 2020.

(Continued)

*Primary Examiner* — Sean Gugger
(74) *Attorney, Agent, or Firm* — Patterson + Sheridan, LLP (57) ABSTRACT

The invention relates to controlling a power generating unit. Aspects of the invention include determining a virtual impedance value (Zvir), determining a virtual grid power (Pvsm) based on the virtual resistance value (Rvir) and the grid current (Igrid), determining a virtual synchronous machine rotational speed (ωVSM) and/or a synchronous machine angle (θVSM) of a virtual synchronous generator, and determining a voltage reference (Vabc) for controlling a line side converter to generate the desired reactive power (Qgrid) based on the virtual synchronous machine rotational speed or angle (ωVSM, θVSM), a virtual voltage (ΔVαβ, ΔVdq) and the voltage magnitude reference (Vqref).

17 Claims, 6 Drawing Sheets

(56) References Cited

FOREIGN PATENT DOCUMENTS

| CN | 108270238 A | 7/2018 |
| CN | 108448643 A | 8/2018 |
| CN | 108695885 A | 10/2018 |
| CN | 109546680 A | 3/2019 |
| DE | 102017106213 A1 | 9/2018 |
| WO | 2021008664 A1 | 1/2021 |

OTHER PUBLICATIONS

Danish Patent and Trademark Office, 1st Technical Examination including The Search Report and Search Opinon for Application PA 2019 70465 dated Jan. 7, 2020.

* cited by examiner

POWER GENERATING UNIT WITH VIRTUAL SYNCHRONOUS GENERATOR WITH CURRENT LIMITATION

FIELD OF THE INVENTION

The invention relates to control of power generating units, particularly renewable power generating units such as wind turbines, and particularly control of power generating units configured to exhibit a virtual synchronous generator response.

BACKGROUND OF THE INVENTION

In order to allow a much higher penetration of renewable energy sources such as wind turbines into the electrical grid, some countries propose requirements to equip the power converters with grid-forming properties similar to conventional synchronous generators. These requirements can be address by configuring the renewable power generating units as virtual synchronous machines VSM.

In overcurrent situations, e.g. where the grid voltage suddenly decreases due to grid short circuits or other faults, the power converter may be exposed to high currents which could damage e.g. the switch semiconductors.

Accordingly, it is a problem that power generating units configured with synchronous machines may experience damaging over currents. Hence, an implementation of the virtual synchronous machine which addresses this and other problems is needed.

SUMMARY OF THE INVENTION

It is an object of the invention to improve control of power generating units such as wind turbines to alleviate one or more of the above mentioned problems, and therefore to provide a method which provides improved control methods of virtual synchronous machines.

In a first aspect of the invention, a method for controlling a power generating unit is provided, the power generating unit comprises a power source, a machine side converter, a line side converter, a DC link electrically connected to an output of the machine side converter and an input of the grid side converter, the method comprises obtaining a current magnitude of the current supplied by the line side converter to a power grid based on a grid current, determining a virtual impedance value based on a current difference between the current magnitude and an overcurrent threshold value, where the virtual impedance value comprises a virtual resistance value and optionally a virtual reactance value, determining a virtual voltage over the virtual impedance value based on the virtual impedance value and the grid current, determining a virtual grid power based on the virtual resistance value and the grid current, or based on a voltage magnitude reference and the grid current, or transformations thereof, determining a virtual synchronous machine rotational speed and/or a synchronous machine angle, where the derivative of the synchronous machine rotational speed is indicative of a deviation between a power reference for a desired power output of the power generating unit and the virtual grid power combined with a damping power, providing the voltage magnitude reference for a desired reactive power to be generated by the line side converter, and determining a voltage reference for controlling the line side converter to generate the desired reactive power based on the virtual synchronous machine rotational speed or angle, the virtual voltage and the voltage magnitude reference.

Advantageously, in abnormal grid conditions and over current situations, method enables a fast reduction of the grid current. The virtual synchronous generator or machine (VSM) has a low thermal capacity and is therefore only capable of supplying over currents for a very short time. By determining the virtual impedance based on the current difference between the current magnitude and the overcurrent threshold, and a virtual power dissipation in the virtual resistance part, and using the virtual grid power determined therefrom, the acceleration of the virtual synchronous generator is reduced and, therefore, the increases in the current delivered by the power converter is reduced. Accordingly, VSM tripping, damages, or wear of the electronic components such as switching transistors of the power converter may be reduced or avoided.

According to an embodiment, the virtual resistance value is determined based on a control algorithm, where the control algorithm comprises a proportional part which determines a value which is proportional with the current difference and/or an integral part which determines a value which is proportional with a time integral of the current difference.

Advantageously, by determining the virtual resistance value of the virtual impedance based on a control algorithm the virtual resistance is based on the magnitude of the current difference and possibly dependent on the integration of the error over time. This method may provide a stable determination of the virtual resistance.

According to an embodiment, the integral part comprises an integral gain which is determined dependent on the current difference, such as the sign of the current difference.

Advantageously, the integral gain could be large for positive current errors to provide fast current limitation. For negative current errors, a smaller gain can be used to provide a stable response under unbalanced cases.

According to an embodiment, the method comprises limiting the virtual resistance value according to minimum and maximum limits.

According to an embodiment, the virtual reactance value of the virtual impedance value is determined dependent on a predetermined factor defining a ratio between the virtual reactance value and the virtual resistance value.

According to an embodiment, the current magnitude is determined as the maximum current magnitude of the current magnitudes of the current phases of the grid current, or as the magnitude of the current vector of the grid current or a transformation thereof.

According to an embodiment, the virtual synchronous machine rotational speed is determined based on a combination of a feedback of a damping power, the power reference, the virtual grid power and an inertial integration model, where the synchronous machine angle is determined based on an integration of the synchronous machine rotational speed, and where the damping power is determined based on the virtual synchronous machine rotational speed.

According to an embodiment, the method comprises
obtaining a network voltage at a connection point of the output of the power generating unit,
determining a rotational speed of the grid based on the network voltage, and determining the damping power based on the virtual synchronous machine rotational speed and the rotational speed of the grid.

According to an embodiment, the method comprises determining a modified voltage reference by combining the voltage magnitude reference, or a transformation thereof, with the a virtual voltage, and determining the voltage reference based on the modified voltage reference.

According to an embodiment, the voltage magnitude reference is defined in a DQ frame.

According to an embodiment, the method comprises transforming the voltage magnitude reference to a transformed voltage magnitude reference in non-rotating target frame, wherein the modified voltage reference is determined by combining said transformed voltage magnitude reference with the virtual voltage.

According to an embodiment, the power generating unit is a wind turbine.

A second aspect of the invention relates to a control system for controlling a power generating unit, the power generating unit comprises a power source, a machine side converter, a line side converter, a DC link electrically connected to an output of the machine side converter and an input of the grid side converter, the control system is arranged to obtain a current magnitude of the current supplied by the line side converter to a power grid based on a grid current, determine a virtual impedance value based on a current difference between the current magnitude and an over-current threshold value, where the virtual impedance value comprises a virtual resistance value and optionally a virtual reactance value, determine a virtual voltage over the virtual impedance value based on the virtual impedance value and the grid current, determine a virtual grid power based on the virtual resistance value and the grid current, or based on a voltage magnitude reference and the grid current, or transformations thereof, determine a virtual synchronous machine rotational speed and/or a synchronous machine angle, where the derivative of the synchronous machine rotational speed is indicative of a deviation between a power reference for a desired power output of the power generating unit and the virtual grid power combined with a damping power, provide a voltage magnitude reference for a desired reactive power to be generated by the line side converter, determine a voltage reference for controlling the line side converter to generate the desired reactive power based on the virtual synchronous machine rotational speed or angle, the virtual voltage and the voltage magnitude reference.

A third aspect of the invention, relates to a power generating unit comprising a control system according to the second aspect.

In general, the various aspects and embodiments of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
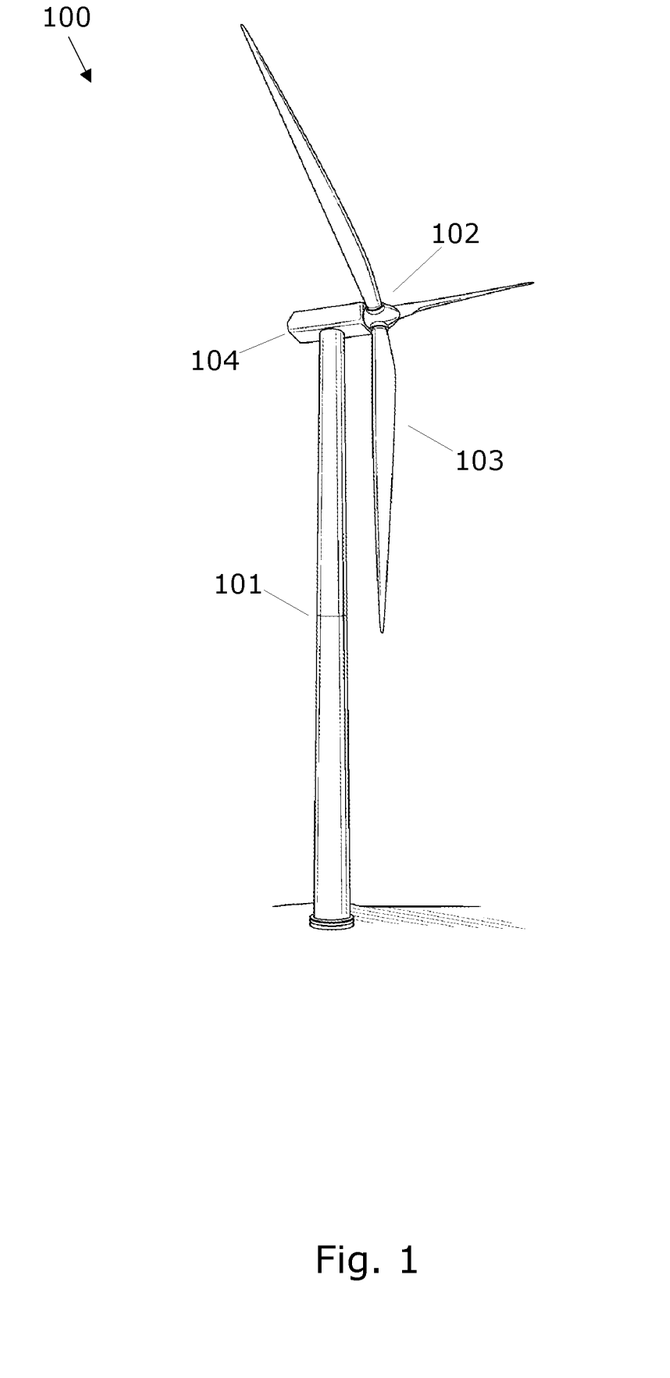
FIG. 1 shows a wind turbine.

FIG. 1 shows a wind turbine 100 (WTG) comprising a tower 101 and a rotor 102 with at least one rotor blade 103, such as three blades. The rotor is connected to a nacelle 104 which is mounted on top of the tower 101 and being adapted to drive a generator situated inside the nacelle via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter which comprises a generator side converter and a line side converter. The generator side converter converts the generator AC power into DC power and the line side converter converts the DC power into an AC power for injection into the utility grid.

Figure 2A:
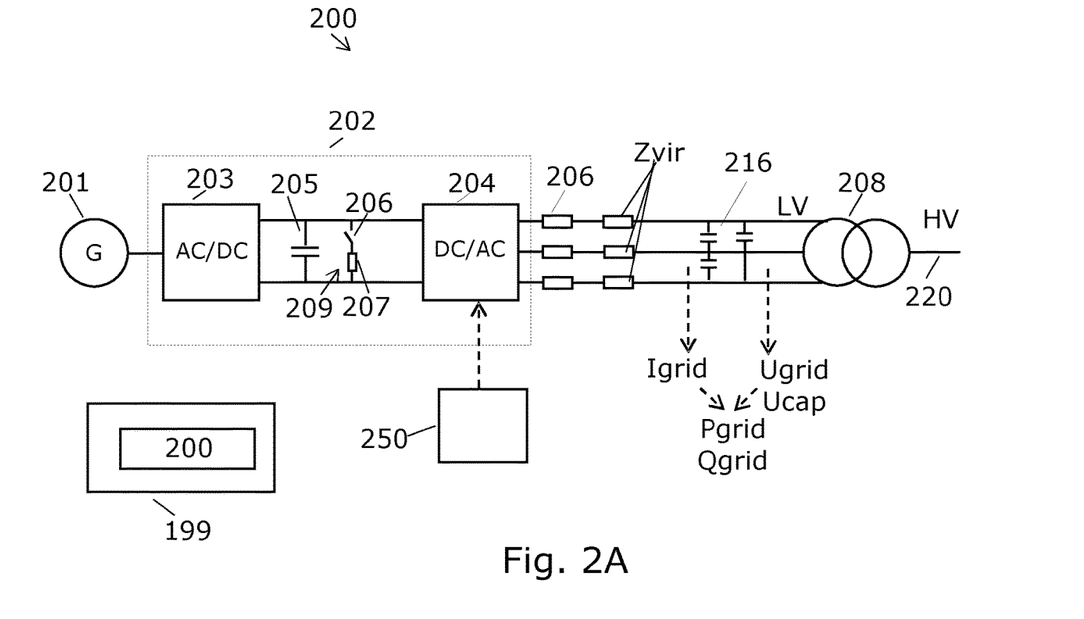
FIG. 2A shows an example of a power system of a wind turbine or a power generating unit.

FIG. 2A shows an example of a power system 200 of a wind turbine 100 according to an embodiment. The power system comprises a generator or power source 201 and a power converter 202. The power converter 202 comprises a machine side converter 203, a line side converter 204. The power converter 202 may further comprise a DC-link 205 and a resistor 207 connected with a controllable switch 206. The resistor and switch forms a power dissipation device, also known as a chopper 209, for dissipating active power. The DC-link 205 comprises one or more DC-link capacitors which are charged by the DC output current from the generator side converter 203 and which supplies DC power to the line side converter 204. The output AC current from the line side converter 204 may be supplied via output inductors 206 and possibly via a wind turbine transformer 208 to the power line 220. In this example, the output AC current is a 3-phase current output. Harmonic filter capacitors 216 may be arranged between the conductors of the output, which together with the inductors 206, forms a harmonic filter which converts the square wave voltage signals from the line side converter 204 to voltage sinusoidal signals.

Since the power system 200 also applies to other power generating units 199 configured with a full scale power converter 202, the examples and embodiments of the present invention applies equally to other power generating units such as renewable power generating units, e.g. solar power units or photovoltaic power generating units. That is, the generator or power source 201 may be embodied by solar power sources such as photovoltaic power sources, wind turbine generators or other power sources or generators. It follows that the power generating unit 199 which comprises the power system 200 may be a wind turbine, a solar power plant or unit or other power units such as renewable power generating units.

The power line 220 may be a medium voltage power bus which receives power from other wind turbines 100. The power line 220 may be connected with a high voltage network, e.g. via further transformers. Thus, the power line 220 and one or more power systems 200 of corresponding wind turbines constitutes a wind power plant or park arranged to supply power to a utility grid for distribution of electrical power.

The power converter 202 may be full-scale converter configured according to different principles including forced-commutated and line-commutated converters.

The power system 200 is principally illustrated and therefore does not explicitly reveal that the system may be a three phase system. However, principles of the described embodiments apply both to single and multi-phase systems. The line side converter 204 uses some variant of pulse width modulation (PWM) for converting the DC power into AC power. The control system 250 is used for controlling the modulation of the line side converter 204 and for controlling the active power P and the reactive power Q generated by the line side converter 204.

FIG. 2A shows that the grid voltage Ugrid, here the voltage at the low voltage LV side of the transformer 208, can be measured. The grid voltage Ugrid can be used for determining a virtual synchronous machine angle θVSM (as described elsewhere) and for controlling the power output of the converter, based on determining the active power Pgrid from grid voltage Ugrid and grid current Igrid. The reactive power Qgrid may similarly be determined from Ugrid and Igrid. Alternatively, the grid voltage Ugrid may be measured on the high voltage HV side of the transformer and corrected based on the turns ratio of the transformer, or the internal voltage magnitude reference Vqref is used instead of the measured voltage Ugrid. Thus, in an alternative, internal voltage magnitude reference such as Vqref, Vdqref or Vαβref may be used for determining Pgrid and consequently the synchronous machine angle θVSM. Thus, the grid current Igrid supplied to the grid can also be measured.

Figure 2B:
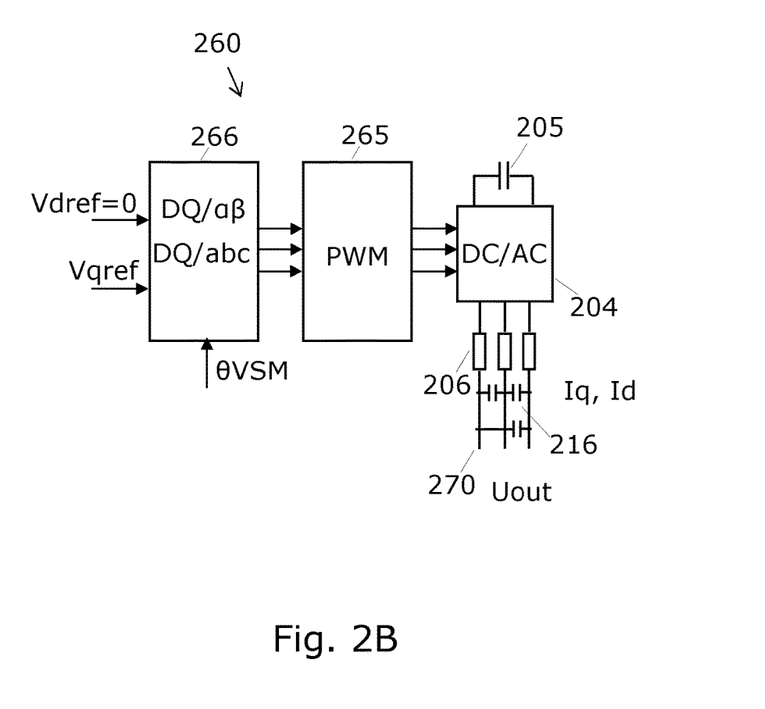
FIG. 2B shows control components arranged for controlling the generation of active power and reactive power supplied to the grid at the power output of the wind turbine or power generating unit.

FIG. 2B shows an example of control components 260 arranged for controlling the generation of active power Pgrid and reactive power Qgrid supplied to the grid at the power output 270 from the wind turbine 100 or power generating unit 199. That is, the control components 260 may be arranged for controlling the output active power Pgrid and the output voltage magnitude at the low voltage side LV, alternatively for controlling the output active power Pgrid and the output reactive power Qgrid at the low voltage side LV. The control components 260 may form part of the control system 250. Alternatively, the control components 260 receive control signals from the control system 250.

References for the active and reactive power may be received from a power plant controller, PPC, or a grid operator, TSO, or determined from active and reactive power references, e.g. from the grid operator.

The active power, Pgrid, is controlled via the virtual synchronous machine angle θVSM. In short, the synchronous machine angle acceleration (the double-time derivative of θVSM) indicates a difference between a power reference Pref for a desired power output of the wind turbine and a grid power Pgrid supplied by the wind turbine to a power grid. Examples for determining the synchronous machine angle θVSM is given elsewhere.

The synchronous machine angle θVSM may be used to transform the signals from the rotating DQ frame into a non-rotating frame such as the αβ or abc frame, or vice-versa. Based on the synchronous machine angle θVSM and voltage magnitude reference Vqref, control signals for the desired active power and reactive power are determined.

Thus, the synchronous machine angle θVSM may be defined in a rotating DQ frame defined by the angular position θVSM. Based on the synchronous machine angle θVSM, control signals, i.e. the angle of the modulation voltage signals for the pulse-width-modulator PWM, 265 are determined and transformed into a non-rotating frame such as the αβ or abc frame. The modulation voltage reference signal controls the active and reactive power Pgrid and Qgrid.

The frame conversion unit 266 transforms the control signal from the DQ frame into the αβ or abc frame and determines the sinusoidal voltage references for the PWM 265. The frame converted output signals from the frame conversion unit 266 are converted by the pulse-width-modulator PWM, 265 into a modulation signal for the grid side converter 204 in order to generate the desired active power and reactive power and/or voltage magnitude.

The reactive power Qgrid to be generated by the line side converter 204 can be controlled based on a voltage magnitude reference Vqref.

The voltage magnitude reference Vqref may be defined in the DQ frame which rotates with the rotational speed ωVSM of the virtual synchronous machine, i.e. in steady state condition the fundamental frequency such as 50 Hz of the AC grid voltage. The voltage magnitude reference Vqref, or a modification thereof as described in the following, may be converted from the DQ frame to the αβ or abc frame and outputted from the frame conversion unit 266 as a control signal to the pulse-width-modulator PWM, 265 which determines the modulation signal for the grid side converter 204.

Due to the low thermal capacity of power converters in contrast to synchronous generators, overcurrent should be limited sufficiently fast to prevent damages of the switch semiconductors of the line side converter 204. Embodiments of the invention, proposes a current limiting method implemented in a virtual synchronous generator which is activated during abnormal grid conditions and overcurrent situations.

FIG. 3A-3B, FIG. 4 and FIG. 5 show examples for implementing the virtual synchronous generator with the current limiting method.

The idea of the current limiting method is to insert a virtual impedance Zvir between the output of the line side converter 204 and the grid or the grid connection such as the transformer 208. The virtual impedance Zvir is principally illustrated in FIG. 2A. The virtual impedance Zvir may be determined for one or more phases. Here the virtual impedance Zvir is determined for commonly for all phases, i.e. as the same virtual impedance. The virtual impedance could also be individually determined for each phase. By increasing the resistive and/or the reactive value of the virtual impedance Zvir, the output current drawn from the output of the line side converter can be reduced. As illustrated in connection with FIG. 4 and FIG. 5, the power value Pvir of the virtual resistance part Rvir of the virtual impedance Zvir, i.e. the virtual power dissipation, is used in the swing equation of the virtual synchronous generator implementation to reduce acceleration of the virtual synchronous generator during overcurrent situations and thereby the output current of the line side converter 204.

An overcurrent may be defined as an output current of the line side converter which is greater than an overcurrent threshold value Imax. The overcurrent threshold value Imax may be a predetermined value, a data-sheet value of the power converter 202, a value which is given as a factor greater than one multiplied with a nominal maximum output current of the power converter 202.

Figure 3A:
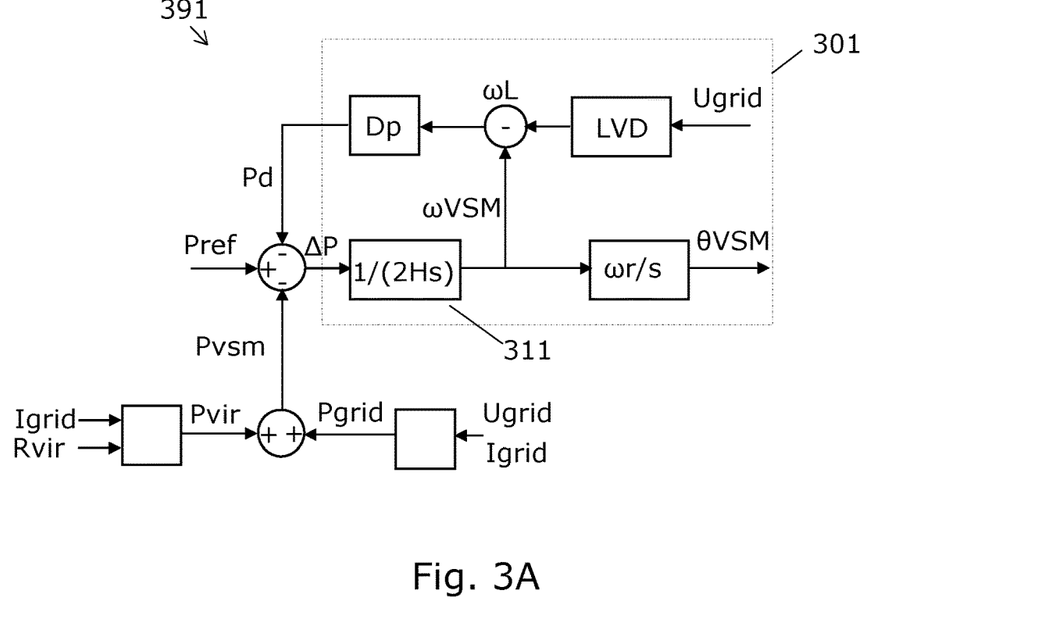
FIG. 3A and FIG. 3B show examples of control systems for determining the synchronous machine angle of the virtual synchronous generator, FIG. 4
Figure 3B:
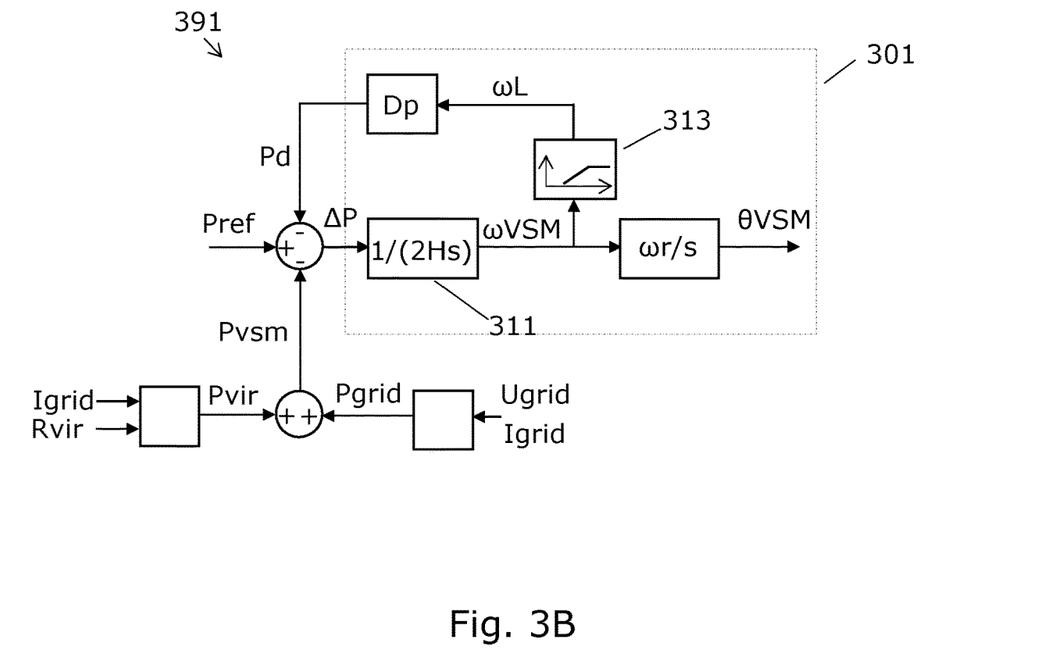

FIG. 3A and FIG. 3B show examples of control systems 391 for determining the synchronous machine angle θVSM of the virtual synchronous generator.

The synchronous machine angle θVSM is determined based on a virtual synchronous machine control concept which aims at generating a power response which corresponds to the power response from a real synchronous generator, including the inertia of the synchronous generator.

The power error ΔP is determined as the difference Pref-Pd-Pvsm, where Pref is a power reference for the desired active power output of the wind turbine, Pd is a damping power determined according to the virtual synchronous model 301, and Pvsm is a virtual grid power. The virtual grid power Pvsm is given as the sum of the measured grid power Pgrid and the virtual power Pvir of the virtual resistor Rvir. Under steady state conditions, the value of the power error ΔP is zero.

In response a change in the grid power Pgrid, e.g. due to an decrease in the grid voltage Ugrid and a corresponding increase in the grid current Igrid, the power error ΔP becomes non-zero, which causes the angle θVSM to increase or decrease to reduce the power error ΔP. For example, in an overcurrent situation where Pgrid decreases, e.g. due to a grid short-circuit, the power error value ΔP becomes positive and synchronous machine speed ωVSM will increase.

Thus, in response to fluctuations in e.g. the grid power Pgrid, the synthetic inertial response value becomes non-zero, which causes the virtual machine to either accelerate or decelerate to reach a new equilibrium condition. The new equilibrium is reached when the virtual grid power Pvsm is again following Pref.

The virtual synchronous machine control concept is utilized on the line side converter 204 using a swing equation to calculate θVSM.

FIG. 3A shows an example of an implementation of the virtual synchronous model 301. The virtual synchronous model 301 includes a closed loop where the virtual synchronous machine rotational speed ωVSM is determined based on a combination a feedback of a damping power Pd, a power reference Pref for the desired active power output of the wind turbine, the active grid power Pgrid supplied by the wind turbine to the grid via the power line 220, the virtual resistor power Pvir and an inertial integration model 311. The inertial integration model 311 is implemented as 1/(2Hs) where H is the inertia time constant and 1/s is the integration in s-domain. Accordingly, the combination of powers Pref−Pd−Pgrid−Pvir=ΔP is used as input for the inertial integration model 311.

Since the derivative of the synchronous machine rotational speed ωVSM is proportional to the deviation between the power reference Pref and the virtual grid power Pvsm, the integration of the difference ΔP gives the synchronous machine rotational speed ωVSM.

The grid power Pgrid can be determined based on the measured grid voltage Ugrid—or internal voltage references such as the magnitude reference Vqref, or transformations thereof such as Vαβref or Vdqref—and the measured grid current Igrid.

The damping power Pd is determined as the difference between the rotational speed of the grid ωL and the synchronous machine rotational speed ωVSM multiplied with the damping factor Dp. The rotational speed of the grid ωL, i.e. the grid frequency is determined from the measured grid voltage Ugrid.

The synchronous machine angle θVSM is determined based on an integration of the synchronous machine rotational speed ωVSM according to ωr/s, where ωr is the rated synchronous generator speed.

FIG. 3B shows an alternative virtual synchronous model 301 which is not based on a measured grid voltage Ugrid, but instead the rotational speed of the grid ωL is determined based on a high-pass filtering of the determined synchronous machine rotational speed ωVSM, i.e. by determining the rotational speed of the grid ωL as the output of the high-pass filter 313 which is arranged to filter the inputted synchronous machine rotational speed ωVSM.

Thus, the alternative virtual synchronous model 301 is not based on a measured grid voltage Ugrid, but the damping part, e.g. the damping power Pd, is determined based on a high-pass filtering 313 of the synchronous machine rotational speed ωVSM.

In general, the virtual synchronous model 301 determines the angle of the virtual machine θVSM based on the combination of powers Pref, Pd, Pgrid, Pvir, the inertial integration model 311, e.g. implemented as 1/(2Hs) and a feedback of the damping power Pd determined based on ωVSM and an integration of ωVSM. In other words, the synchronous machine rotational speed ωVSM and the synchronous machine angle θVSM are determined so that they are indicative of an integrated deviation between a power reference Pref for a desired power output of the wind turbine and the virtual grid power Pvsm.

The control systems 391 can be implemented based on power values Pref, Pd, Pgrid, Pvir but may equivalently be implemented based on corresponding torque values Tref, Td, Tgrid, Tvir based on the relationship where power equals torque times rotation frequency, e.g. the synchronous machine rotational speed ωVSM.

Figure 4:
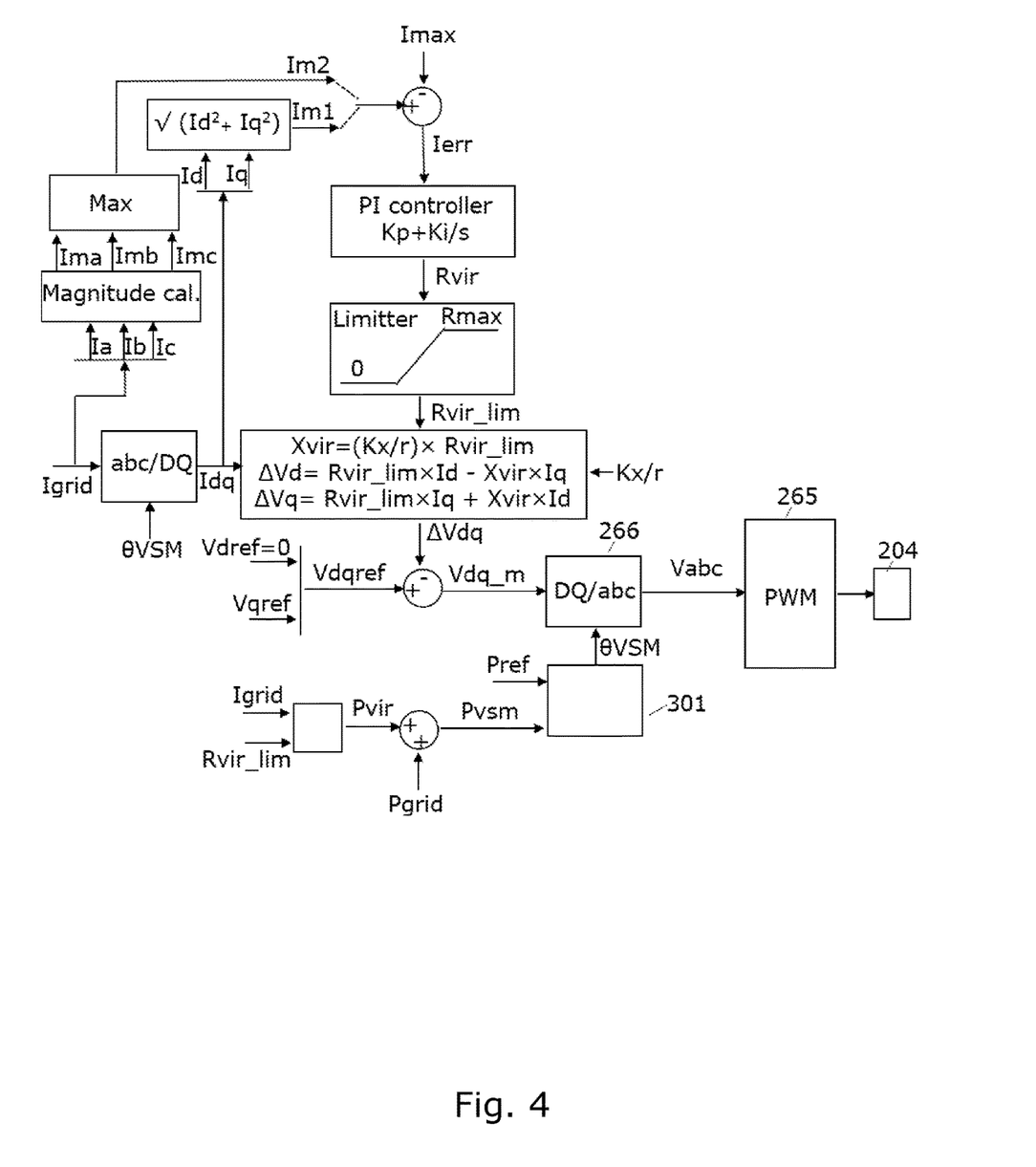
Figure 5:
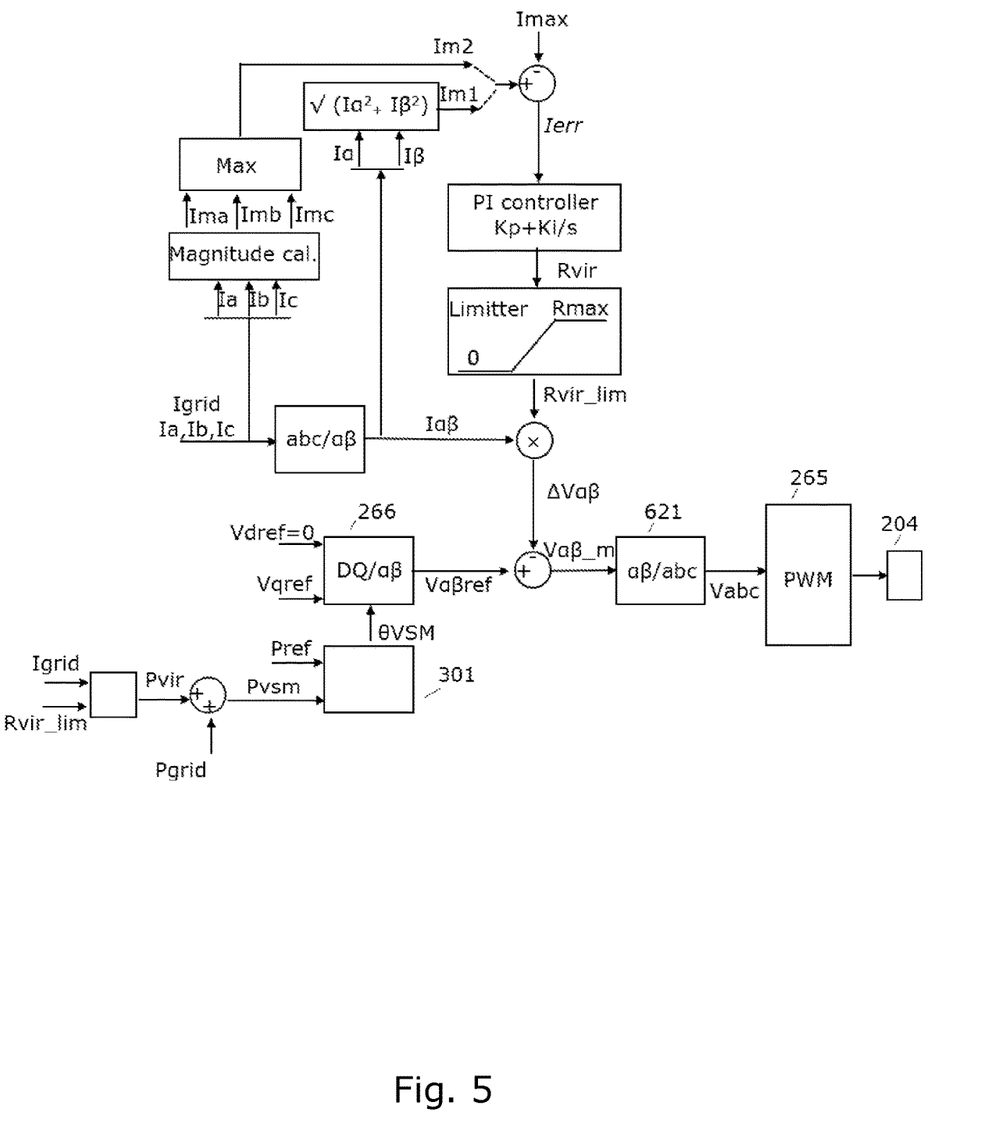
FIG. 5 shows examples for implementing the virtual synchronous generator with the current limiting method.

FIGS. 4 and 5 show examples of determining the virtual impedance Zvir and feeding the virtual resistor power Pvir into the virtual synchronous model 301.

A current magnitude Im1 or Im2 is determined based on the grid current Igrid. The current magnitude Im1 or Im2 is determined so that the current magnitude represents the instantaneous current magnitude of the current. In this context, instantaneous may be the actual current amplitude per sample, or an average obtained over two or more samples, such as 10 samples.

The current magnitude Im1, Im2 may be determined based on the current components Ia, Ib, Ic in the reference frame, i.e. the current amplitudes of the available phases, based on the current components Id and Iq (FIG. 4) and/or based on the current components Iα and Iβ (FIG. 5).

The current components Id, Iq are obtained by transforming the current signals Ia, Ib, Ic of the three-phase current signal Igrid from the measurement frame abc to the DQ frame which rotates with the virtual synchronous angular frequency. The abc/DQ transformation is performed based on the virtual synchronous machine angle θVSM. The abc/DQ transformation is the projection of the current quantities Ia, Ib, Ic—or other quantities such as voltages—onto the two-axis frame DQ which rotates according to the angle θVSM.

The current components Iα, Iβ are obtained by transforming the current signals Ia, Ib, Ic of the three-phase current signal Igrid from the measurement frame abc to the αβ frame which is stationary. The abc/o transformation is the projection of the current quantities Ia, Ib, Ic—or other quantities such as voltages—onto the two-axis stationary frame αβ.

The current magnitude Im1 may be determined as the square root of the squares of the current components Iα, Iβ or the squares of the current components Id, Iq. Thus, the current components Iα, Iβ or Id, Iq may be determined for each sample, possibly as an average may be determined over a few samples.

Alternatively, the current magnitude Im2 may be determined based on the phase current magnitudes Ima, Imb, Imc, e.g. determined as the current amplitude or peak current value within a period, of the current signals. Further, the current magnitude Im2 may be determined as the maximum of the determined current magnitudes Ima, Imb, Imc, or in other ways dependent on the current magnitudes.

If a fast response is needed, i.e. if a fast compensation via the virtual impedance Zvir is needed, the first alternative of the current magnitude Im1 may be preferred, due to the faster computation of Im1 compared with Im2.

If a better performance in unbalanced situations is needed, the second alternative of the current magnitude Im2 may be preferred. In unbalanced cases, the magnitude of one phase, for example Ima, may be much larger than other phases (Imb and Imc), consequently Im2 would be larger than Im1. So, If Im2 is selected to limit the current, a suitable larger virtual impedance may be inserted. The virtual impedance value Zvir is determined by initially determining the virtual resistance part Rvir of the virtual impedance Zvir. The determination of the reactive part Xvir of the virtual impedance Zvir is determined based on the initially determined virtual resistance Rvir, but the determination of Xvir is optional since the method also works without determining the reactive part Xvir. Advantageously, Xvir may provide more independent active and reactive power control loops during overcurrent conditions.

The virtual resistance Rvir is determined based on the current difference or current error Ierr, i.e. the difference between the current magnitude Im1 or Im2 and the overcurrent threshold value Imax. Consequently, the virtual reactance Xvir and the virtual impedance Zvir is also determined based on the current difference Ierr. When the current magnitude Im1, or Im2 is lower than Imax, the current difference Ierr becomes negative and the virtual impedance Zvir is reduced (if not already equal to zero) until it is saturated to the zero value. Accordingly, in normal operation Zvir and Pvir equals zero values.

In this example, the virtual resistance Rvir is determined using a controller. For example, the controller may be an integral controller (I-controller), proportional controller (P-controller) or a proportional-integral controller (PI-controller). Accordingly, the control algorithm of the controller may include a proportional part which determines a value which is proportional with the current difference Ierr and/or an integral part which determines a value which is proportional with a time integral of the current difference Ierr. Accordingly, the virtual resistance Rvir is obtained based the values determined by the P-controller and/or the I-controller, or the PI-controller.

The integral part of the controller comprises an integral gain Ki which may be determined dependent on the current difference Ierr, such as the sign of the current difference Ierr. For example, in order to achieve a fast control action when the current difference Ierr is positive, i.e. when the current magnitude Im1, Im2 is greater than Imax, the integral gain Ki may be set to a predetermined relative larger gain Ki1. For negative current differences Ierr, the integral gain Ki may be set to a predetermined relative smaller gain Ki2 to achieve a more stable response during unbalanced situations, where Im1/Im2 may oscillate. Furthermore, the integral gain Ki could also depend on the magnitude of the positive or negative difference Ierr, i.e. by having predetermined gain factors Ki for different signs and magnitudes of the current error Ierr. Therefore, the integral gain Ki may be determined from two or more predetermined gains. In the above example with two gains Ki1 and Ki2, where Ki1 is greater than Ki2. Thus in an example, when Ierr>0, Ki=Ki1 is selected to limit the grid current fast. When Ierr<0, Ki=Ki2 is selected to have a stable response for the unbalanced cases.

The determined virtual resistance value Rvir may be limited by the limiter according to a lower minimum limit Rmin and/or an upper maximum limit Rmax to avoid determination of negative resistance values and/or very large values. The output from the limiter is referred to as Rvir_lim.

As illustrated in FIG. 4, the virtual reactance value Xvir may be determined based on the determined virtual resistance Rvir or the limited virtual resistance Rvir_lim. For example, the virtual reactance value Xvir may be determined dependent on a predetermined factor "Kx/r" which determines a ratio between the virtual reactance value Xvir and the virtual resistance value Rvir. The Kx/r factor may be an empirically determined factor, e.g. determined based required damping and grid conditions. For example, the Kx/r factor could be a value in the range from zero to ten.

The voltage $\Delta$Vdq over the virtual impedance Zvir is determined as shown in FIG. 4 as $\Delta$Vd=Rvir_lim×Id−Xvir×Iq and $\Delta$Vq=Rvir_lim×Iq+Xvir×Id. For that purpose, the grid current Igrid is transformed into Idq in the DQ frame and the impedance voltage is determined in the DQ frame. If Xvir is not determined, Xvir is simply set to zero in the equations.

In the example in FIG. 5, the voltage $\Delta$Vαβ over the virtual impedance Zvir is determined based on the grid current Igrid transformed into Iαβ in the αβ frame. The voltage may be determined as $\Delta$Vα=Rvir_lim×Iα+(Xvir/ωVSM)×d(Iα)/dt and $\Delta$Vβ=Rvir_lim×Iβ+(Xvir/ωVSM)×d(Iβ)/dt (not shown in FIG. 5).

Alternatively, as shown in FIG. 5, in order to avoid the derivative part, only the virtual resistance Rvir or the limited resistance Rvir_lim is determined and the voltage over the virtual resistance is determined as Iαβ×Rvir_lim or Iαβ×Rvir.

As another alternative the voltage $\Delta$Vabc over the virtual impedance Zvir may be determined by multiplying the current components Ia, Ib, Ic with the resistance and/or reactance components of the virtual impedance Zvir.

In general as illustrated with examples in FIG. 4 and FIG. 5, the virtual voltage $\Delta$Vαβ, $\Delta$Vdq over the virtual impedance Zvir is determined based on the virtual impedance value Zvir and the grid current Igrid, or a transformation thereof.

In FIG. 4, the virtual voltage $\Delta$Vdq is combined, here subtracted, with the voltage reference Vdqref to generate the modified voltage reference Vdq_m.

The virtual power Pvir of the virtual resistor Rvir is determined as Pvir=1.5×Im1^2×Rvir or 1.5×Im2^2×Rvir.

The virtual grid power Pvsm is determined as the sum of the virtual power Pvir and the grid power Pgrid=Ugrid×Igrid.

Alternatively, the virtual grid power Pvsm may be determined as Pvsm=1.5×(Vαref×Iα+Vβref×Iβ) or Pvsm=1.5 (Vdref×Id+Vqref×Iq), where Vαref and Vβref are the components of Vαβref, and where Vdref and Vqref are the components of Vdqref. Accordingly, the virtual grid power Pvsm may alternatively be determined based on the voltage magnitude reference Vqref and the grid current Igrid, or transformations thereof according to the equations.

Thus, in general the virtual grid power Pvsm may be determined based on the virtual resistance Rvir and the grid current Igrid or transformations therefrom, or based on the voltage references (Vdqref, Vαref) and the grid current Igrid or transformations therefrom.

As described in connection with FIGS. 3A and 3B, based on the deviation ΔP between the power reference Pref for a desired power output of the power generating unit and the virtual grid power Pvsm combined with a damping power (Pd), the virtual synchronous machine rotational speed ωVSM and/or the synchronous machine angle θVSM is determined by the virtual synchronous model 301, where the derivative of the synchronous machine rotational speed (ωVSM) is indicative of the power deviation ΔP.

The voltage reference Vabc for controlling the line side converter 204 to generate the desired reactive power Qgrid is determined by the frame conversion unit 266 based on the virtual synchronous machine rotational speed or angle ωVSM, θVSM, and a combination of the virtual voltage ΔVαβ, ΔVdq and the voltage magnitude reference Vdqref, here the difference Vdqref−ΔVdq. Here it is noted that Vdref may be zero, so that Vdqref equals Vαref. The voltage magnitude reference Vαref is provided to achieve a desired reactive power Qgrid to be generated by the line side converter 204. Thus, the voltage reference Vdqref is the voltage reference in the DQ frame generated based on the voltage magnitude reference Vqref.

The virtual synchronous machine angle θVSM is used by the frame conversion unit 266 to perform the transformation of the voltage signal Vdq_m from the DQ frame into the voltage signal Vabc in the abc frame. The voltage signal Vabc is provided as a control signal to the pulse-width-modulator PWM, 265 in order to generate the active power P based on θVSM as described in connection with FIG. 2A. The virtual synchronous machine angle θVSM is determined as described in connection with FIG. 3A-B and is used for determining the control signal Vabc via the frame conversion unit 266.

Accordingly, if a positive current error Ierr is generated, the virtual power Pvir determined from the virtual resistance Rvir is added to the grid power Pgrid and results in an increased virtual grid power Pvsm. The increased virtual grid power Pvsm results in reducing the error ΔP and consequently decreasing of θvsm. This causes that the angle difference between Vabc and Ugrid is decreased, which causes a decrease in the grid current Igrid supplied by the line side converter 204 to the grid.

The filter compensated voltage reference Vdq_f is transformed from the DQ frame to the measurement frame abc similarly to the control signal derived from the synchronous machine angle θVSM FIG. 5 shows an alternative example for determining and implementing the virtual impedance Zvir and feeding the virtual resistor power Pvir into the virtual synchronous model 301. Here the example, only shows determination of the virtual resistance Rvir.

In this example, the grid current Igrid, i.e. the current components Ia, Ib, Ic, is transformed from the measurement frame abc to Iαβ in the stationary αβ frame. The abc/αβ transformation transforms the three vector values in the measurement frame abc to two vector values in the αβ frame.

The voltage magnitude reference Vαβref is the αβ transformed version of Vdqref, where Vdqref is the voltage reference Vdgref in the DQ frame generated based on the voltage magnitude reference Vqref (not explicitly shown in FIG. 5).

The virtual synchronous machine angle θVSM is used by the frame conversion unit 266 for transforming the Vdgref from the DQ frame into Vαp in the αβ frame. The voltage control signal Vαβ is transformed by transform element 621 to the control signal Vabc in the measurement frame abc and is provided as a control signal to the pulse-width-modulator PWM.

The determination of the virtual grid power Pvsm in FIG. 5 is equivalent to the determination of Pvsm in FIG. 4.

The virtual voltages ΔVαβ are combined, here subtracted, with the voltage reference Vαβref to generate the modified voltage reference Vαβ_m.

The modified voltage reference Vαβ_m is transformed from the αβ frame to voltage control signal Vabc in the measurement frame abc by the αβ/abc transform element 621.

Accordingly, the response of the circuit in FIG. 5 due positive current error Ierr is equivalent to the control response of the circuit in FIG. 4.

Figure 6:
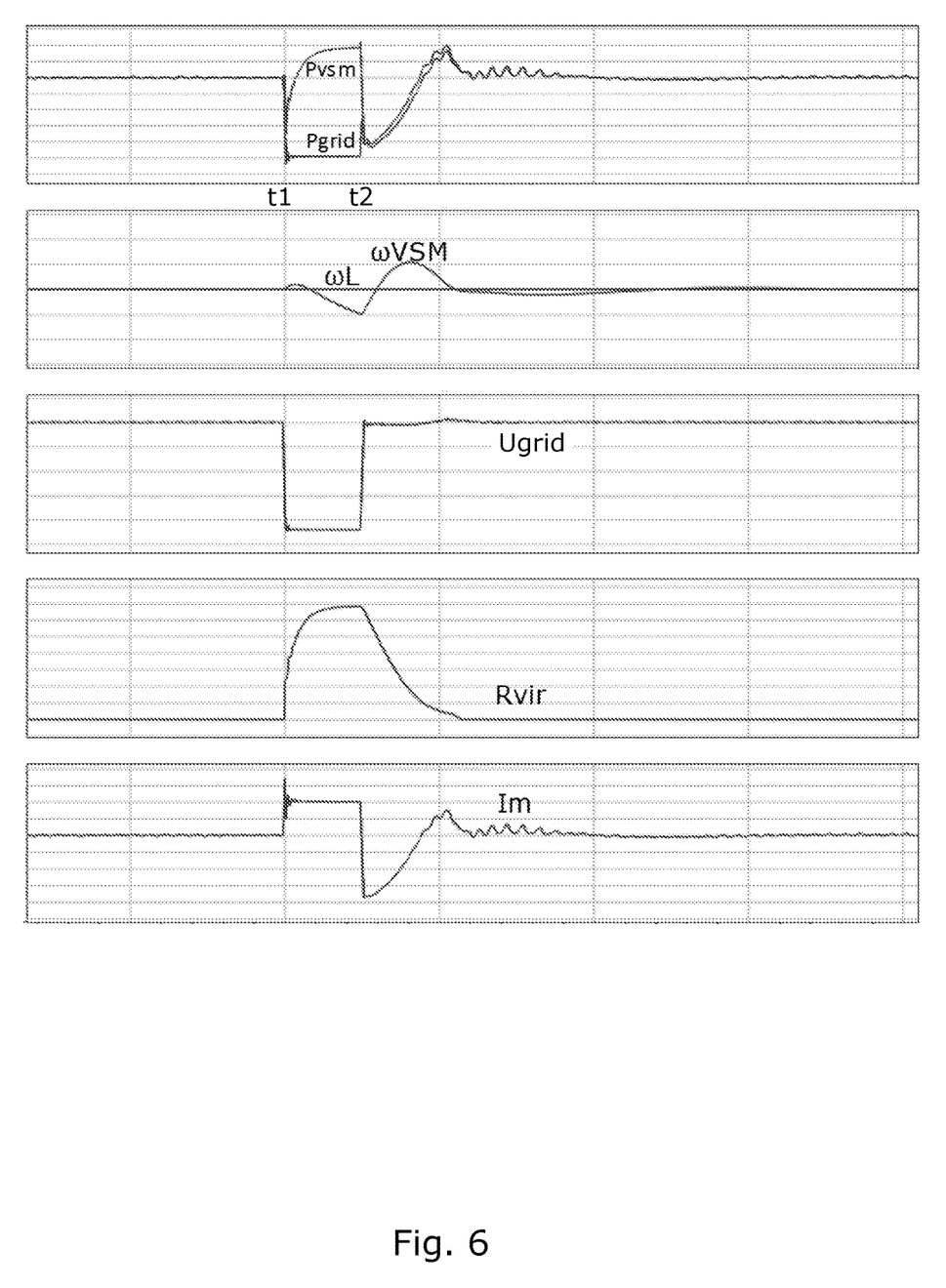
FIG. 6 illustrates simulation results of an embodiment with the current limiting method.

FIG. 6 illustrates simulation results of an embodiment with the current limiting method. At t1 the grid voltage magnitude Ugrid decreases due to a grid fault and consequently the grid power Pgrid decreases. The current magnitude Im, which could be Im1 or Im2, increases due to the grid fault and causes an increasing virtual resistance Rvir and consequently an increasing virtual grid power Pvsm due to increasing virtual power Pvir. At t1 the virtual synchronous speed ωVSM starts decreasing after an initial minor increase and, therefore, limits the increase of the virtual synchronous machine angle θVSM. As both the magnitude and angle difference between Vabc and Ugrid are decreased, the large values of the grid current Igrid or the grid current magnitude is prevented.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a power generating unit, the power generating unit comprises a power source, a machine side converter, a line side converter, a DC link electrically connected to an output of the machine side converter and an input of the lineside converter, the method comprising:
obtaining a current magnitude of current supplied by the line side converter to a power grid based on a grid current;
determining a virtual impedance value based on a current difference between the current magnitude and an over-current threshold value, where the virtual impedance value comprises a virtual resistance value;

determining a virtual voltage over the virtual impedance value based on the virtual impedance value and the grid current;

determining a virtual grid power based on the virtual resistance value and the grid current, or based on a voltage magnitude reference and the grid current, or transformations thereof;

determining a virtual synchronous machine rotational speed and/or a synchronous machine angle, where a derivative of the virtual synchronous machine rotational speed is indicative of a deviation between a power reference for a desired power output of the power generating unit and the virtual grid power combined with a damping power;

providing the voltage magnitude reference for a desired reactive power to be generated by the line side converter; and determining a voltage reference for controlling the line side converter to generate the desired reactive power based on the virtual synchronous machine rotational speed or angle, the virtual voltage and the voltage magnitude reference; and wherein the virtual resistance value is determined based on a control algorithm, where the control algorithm comprises a proportional part which determines a value which is proportional with the current difference and an integral part which determines a value which is proportional with a time integral of the current difference.

2. The method of claim 1, wherein the integral part comprises an integral gain Ki that is determined dependent on the current difference.

3. The method of claim 1, wherein the method comprises limiting the virtual resistance value according to minimum and maximum limits.

4. The method of claim 1, wherein the virtual impedance value comprises a virtual reactance value, the virtual reactance value is determined dependent on a predetermined factor defining a ratio between the virtual reactance value and the virtual resistance value, and wherein the virtual voltage is determined based on the virtual reactance value.

5. The method of claim 1, wherein the current magnitude is determined as a maximum current magnitude of current magnitudes of current phases of the grid current, or as a magnitude of a current vector of the grid current or a transformation thereof.

6. The method of claim 4, wherein determining the virtual voltage based on the virtual reactance value comprises:

transforming current signals of the grid current from a measurement frame to: i) a DQ frame that rotates with a virtual synchronous angular frequency; or ii) an op frame that is stationary so as to determine current components;

determining a first virtual voltage component of the virtual voltage by subtracting a product of the virtual reactance value and a second component of the current components from a product of the virtual resistance value and a first component of the current components; and determining a second virtual voltage component of the virtual voltage by subtracting a product of the virtual reactance value and the first component of the current components from a product of the virtual resistance value and the second component of the current components, and wherein the first virtual voltage component and the second virtual voltage component form the virtual voltage.

7. The method of claim 1, where the virtual synchronous machine rotational speed is determined based on a combination of a feedback of a damping power, the power reference, the virtual grid power and an inertial integration model, where the synchronous machine angle is determined based on an integration of the virtual synchronous machine rotational speed, and where the damping power is determined based on the virtual synchronous machine rotational speed.

8. The method of claim 1, comprising:
obtaining a network voltage at a connection point of the output of the power generating unit;
determining a rotational speed of the grid based on the network voltage; and
determining the damping power based on the virtual synchronous machine rotational speed and the rotational speed of the grid.

9. The method of claim 1, comprising:
determining a modified voltage reference by combining the voltage magnitude reference, or a transformation thereof, with the virtual voltage, and
determining the voltage reference based on the modified voltage reference.

10. The method of claim 1, wherein the voltage magnitude reference is defined in a DQ frame.

11. The method of claim 10, wherein the method comprises transforming the voltage magnitude reference to a transformed voltage magnitude reference in a non-rotating target frame and wherein a modified voltage reference is determined by combining said transformed voltage magnitude reference with the virtual voltage.

12. The method of claim 1, wherein the power generating unit is a wind turbine.

13. The method of claim 1, wherein obtaining the current magnitude of the current supplied by the line side converter to the power grid based on the grid current comprises:
selecting one of a first current magnitude and a second current magnitude as the current magnitude of the current supplied by the line side converter to the power grid,
the first current magnitude being determined by:
transforming current signals of the grid current from a measurement frame to: i) a DQ frame that rotates with a virtual synchronous angular frequency; or ii) a non-rotating frame so as to determine current components; and
calculating a square root of squares of the current components, the first current magnitude is set as the square root of the squares, and
the second current magnitude being determined by:
calculating a current magnitude for each of the current signals of the grid current within a period; and
determining a maximum of the current magnitudes, the second current magnitude is set as the maximum of the current magnitudes.

14. A control system for controlling a power generating unit, the power generating unit comprises a power source, a machine side converter, a line side converter, a DC link electrically connected to an output of the machine side converter and an input of the line side converter, the control system is arranged to:
obtain a current magnitude of current supplied by the line side converter to a power grid based on a grid current;
determine a virtual impedance value based on a current difference between the current magnitude and an overcurrent threshold value, where the virtual impedance value comprises a virtual resistance value;

determine a virtual voltage over the virtual impedance value based on the virtual impedance value and the grid current;

determine a virtual grid power based on the virtual resistance value and the grid current, or based on a voltage magnitude reference and the grid current, or transformations thereof;

determine a virtual synchronous machine rotational speed and/or a synchronous machine angle, where a derivative of the virtual synchronous machine rotational speed is indicative of a deviation between a power reference for a desired power output of the power generating unit and the virtual grid power combined with a damping power;

provide a voltage magnitude reference for a desired reactive power to be generated by the line side converter; and determine a voltage reference for controlling the line side converter to generate the desired reactive power based on the virtual synchronous machine rotational speed or angle, the virtual voltage and the voltage magnitude reference; and wherein the virtual resistance value is determined based on a control algorithm, where the control algorithm comprises a proportional part which determines a value which is proportional with the current difference and an integral part which determines a value which is proportional with a time integral of the current difference.

15. The control system of claim 14, wherein the integral part comprises an integral gain Ki that is determined dependent on the current difference.

16. The control system of claim 14, further comprising limiting the virtual resistance value according to minimum and maximum limits.

17. A power generating unit, comprising:
a power source;
a machine side converter;
a line side converter;
a DC link electrically connected to an output of the machine side converter and an input of the line side converter; and a control system, comprising a memory communicatively coupled to one or more processors; the one or more processors configured to perform an operation, comprising:

obtaining a current magnitude of current supplied by the line side converter to a power grid based on a grid current;

determining a virtual impedance value based on a current difference between the current magnitude and an overcurrent threshold value, where the virtual impedance value comprises a virtual resistance value;

determining a virtual voltage over the virtual impedance value based on the virtual impedance value and the grid current;

determining a virtual grid power based on the virtual resistance value and the grid current, or based on a voltage magnitude reference and the grid current, or transformations thereof;

determining a virtual synchronous machine rotational speed and/or a synchronous machine angle, where a derivative of the virtual synchronous machine rotational speed is indicative of a deviation between a power reference for a desired power output of the power generating unit and the virtual grid power combined with a damping power;

providing a voltage magnitude reference for a desired reactive power to be generated by the line side converter; and determining a voltage reference for controlling the line side converter to generate the desired reactive power based on the virtual synchronous machine rotational speed or angle, the virtual voltage and the voltage magnitude reference; and wherein the virtual resistance value is determined based on a control algorithm, where the control algorithm comprises a proportional part which determines a value which is proportional with the current difference and an integral part which determines a value which is proportional with a time integral of the current difference.

* * * * *